US010950047B2

(12) United States Patent
Kaifosh et al.

(10) Patent No.: US 10,950,047 B2
(45) Date of Patent: *Mar. 16, 2021

(54) TECHNIQUES FOR ANONYMIZING NEUROMUSCULAR SIGNAL DATA

(71) Applicant: Facebook Technologies, LLC, Menlo Park, CA (US)

(72) Inventors: Patrick Kaifosh, New York, NY (US); Tudor Giurgica-Tiron, Stanford, CA (US); Steven Kober, New York, NY (US); Adam Al-natsheh, New York, NY (US); Alexandre Barachant, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,990

(22) Filed: Oct. 16, 2019

(65) Prior Publication Data

US 2020/0118334 A1     Apr. 16, 2020

Related U.S. Application Data

(63) Continuation of application No. 16/258,442, filed on Jan. 25, 2019, now Pat. No. 10,504,286.

(Continued)

(51) Int. Cl.
*G06T 15/00* (2011.01)
*G06T 19/00* (2011.01)
(Continued)

(52) U.S. Cl.
CPC .............. *G06T 19/00* (2013.01); *G06F 3/014* (2013.01); *G06F 3/015* (2013.01); *G06F 3/016* (2013.01);
(Continued)

(58) Field of Classification Search
CPC .............. A61B 5/7264; A61B 5/02411; A61B 5/02444; A61B 5/0816; A61B 5/1107;
(Continued)

(56) References Cited

U.S. PATENT DOCUMENTS 4,896,120 A    1/1990   Kamil
5,625,577 A    4/1997   Kunii et al.
(Continued)

FOREIGN PATENT DOCUMENTS

CA   2 902 045 A1   8/2014
CA   2 921 954 A1   2/2015
(Continued)

OTHER PUBLICATIONS

Non-Final Office Action received for U.S. Appl. No. 16/258,442 dated Apr. 16, 2019, 24 pages.

(Continued)

*Primary Examiner* — Phu K Nguyen
(74) *Attorney, Agent, or Firm* — FisherBroyles, LLP

(57) ABSTRACT

Methods and apparatus for anonymizing neuromuscular signals used to generate a musculoskeletal representation. The method comprises recording, using a plurality of neuromuscular sensors arranged on one or more wearable devices, a plurality of neuromuscular signals from a user, providing as input to a trained statistical model, the plurality of neuromuscular signals and/or information based on the plurality of neuromuscular signals; and generating, the musculoskeletal representation based, at least in part, on an output of the trained statistical model, wherein the musculoskeletal representation is an anonymized musculoskeletal representation from which at least one personal characteristic of the user has been removed.

27 Claims, 4 Drawing Sheets

Related U.S. Application Data

(60) Provisional application No. 62/621,782, filed on Jan. 25, 2018.

(51) Int. Cl.
  *G06N 20/00* (2019.01)
  *G06F 3/01* (2006.01)

(52) U.S. Cl.
  CPC .............. *G06F 3/017* (2013.01); *G06N 20/00* (2019.01); *G06F 2203/011* (2013.01)

(58) Field of Classification Search
  CPC ... A61B 5/1116; A61B 5/1123; A61B 5/1126; A61B 5/4362; A61B 5/4851; A61B 5/6802; A61B 2503/02; A61B 2505/09; A61B 2560/0257; A61B 2503/10; A61B 7/006; A61B 5/7246; A61B 5/4519; A61B 5/1121; A61B 5/0205; A61B 2562/164; A61B 2562/0223; A61B 2562/0219; A61B 2562/0204; A61B 2560/0475; A61B 2503/12; A61B 2562/0247
  USPC ........................................................ 345/418
  See application file for complete search history.

(56) References Cited

U.S. PATENT DOCUMENTS

| | | | |
|---|---|---|---|
| 6,005,548 A | 12/1999 | Latypov et al. |
| 6,009,210 A | 12/1999 | Kand |
| 6,244,873 B1 | 6/2001 | Hill et al. |
| 6,411,843 B1 | 6/2002 | Zarychta |
| 6,658,287 B1 | 12/2003 | Litt et al. |
| 6,720,984 B1 | 4/2004 | Jorgensen et al. |
| 6,774,885 B1 | 8/2004 | Even-Zohar |
| 6,942,621 B2 | 9/2005 | Avinash et al. |
| 7,089,148 B1 | 8/2006 | Bachmann et al. |
| 7,351,975 B2 | 4/2008 | Brady et al. |
| 7,574,253 B2 | 8/2009 | Edney et al. |
| 7,580,742 B2 | 8/2009 | Tan et al. |
| 7,787,946 B2 | 8/2010 | Stahmann et al. |
| 7,805,386 B2 | 9/2010 | Greer |
| 7,901,368 B2 | 3/2011 | Flaherty et al. |
| 8,170,656 B2 | 5/2012 | Tan et al. |
| 8,190,249 B1 | 5/2012 | Gharieb et al. |
| 8,311,623 B2 | 11/2012 | Sanger |
| 8,351,651 B2 | 1/2013 | Lee |
| 8,421,634 B2 | 4/2013 | Tan et al. |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,484,022 B1 | 7/2013 | Vanhoucke |
| 8,718,980 B2 | 5/2014 | Garudadri et al. |
| 8,744,543 B2 | 6/2014 | Li et al. |
| 8,754,862 B2 | 6/2014 | Zaliva |
| 8,880,163 B2 | 11/2014 | Barachant et al. |
| 8,890,875 B2 | 11/2014 | Jammes et al. |
| 8,892,479 B2 | 11/2014 | Tan et al. |
| 9,037,530 B2 | 5/2015 | Tan et al. |
| 9,218,574 B2 | 12/2015 | Phillipps et al. |
| 9,235,934 B2 | 1/2016 | Mandella et al. |
| 9,240,069 B1 | 1/2016 | Li |
| 9,278,453 B2 | 3/2016 | Assad |
| 9,299,248 B2 | 3/2016 | Lake et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,408,316 B2 | 8/2016 | Bailey et al. |
| 9,459,697 B2 | 10/2016 | Bedikian et al. |
| 9,483,123 B2 | 11/2016 | Aleem et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 10,042,422 B2 | 8/2018 | Morun et al. |
| 10,070,799 B2 | 9/2018 | Ang et al. |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,335,080 B2 * | 7/2019 | Vaidyanathan ...... A61B 5/0205 |
| 10,504,286 B2 * | 12/2019 | Kaifosh .................. G06F 3/015 |
| 2003/0144829 A1 | 7/2003 | Geatz et al. |
| 2003/0171921 A1 | 9/2003 | Manabe et al. |
| 2004/0092839 A1 | 5/2004 | Shin et al. |
| 2007/0172797 A1 | 7/2007 | Hada et al. |
| 2007/0256494 A1 | 11/2007 | Nakamura et al. |
| 2007/0285399 A1 | 12/2007 | Lund |
| 2008/0052643 A1 | 2/2008 | Ike et al. |
| 2008/0214360 A1 | 9/2008 | Stiding et al. |
| 2008/0221487 A1 | 9/2008 | Zahar et al. |
| 2009/0082692 A1 | 3/2009 | Hale et al. |
| 2009/0082701 A1 | 3/2009 | Zohar et al. |
| 2009/0112080 A1 | 4/2009 | Matthews |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0063794 A1 | 3/2010 | Hernandez-Rebollar |
| 2010/0106044 A1 | 4/2010 | Linderman |
| 2010/0280628 A1 | 11/2010 | Sankai |
| 2010/0292617 A1 | 11/2010 | Lei et al. |
| 2010/0293115 A1 | 11/2010 | Seyed Momen |
| 2010/0315266 A1 | 12/2010 | Gunawardana et al. |
| 2011/0077484 A1 | 3/2011 | Van Slyke et al. |
| 2011/0092826 A1 | 4/2011 | Lee et al. |
| 2012/0066163 A1 | 3/2012 | Balls et al. |
| 2012/0188158 A1 | 7/2012 | Tan et al. |
| 2012/0265480 A1 | 10/2012 | Oshima |
| 2012/0283526 A1 | 11/2012 | Gommesen et al. |
| 2013/0077820 A1 | 3/2013 | Marais et al. |
| 2013/0141375 A1 | 6/2013 | Ludwig et al. |
| 2013/0207889 A1 | 8/2013 | Chang et al. |
| 2013/0217998 A1 | 8/2013 | Mahfouz et al. |
| 2013/0232095 A1 | 9/2013 | Tan et al. |
| 2013/0317382 A1 | 11/2013 | Le |
| 2013/0317648 A1 | 11/2013 | Assad |
| 2014/0052150 A1 | 2/2014 | Taylor et al. |
| 2014/0092009 A1 | 4/2014 | Yen et al. |
| 2014/0098018 A1 | 4/2014 | Kim et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0223462 A1 | 8/2014 | Aimone et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0278441 A1 | 9/2014 | Ton et al. |
| 2014/0304665 A1 | 10/2014 | Holz |
| 2014/0334083 A1 | 11/2014 | Bailey |
| 2014/0344731 A1 | 11/2014 | Holz |
| 2014/0355825 A1 | 12/2014 | Kim et al. |
| 2014/0365163 A1 | 12/2014 | Jallon |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |

(56) References Cited

U.S. PATENT DOCUMENTS

| | | |
|---|---|---|
| 2015/0045699 A1 | 2/2015 | Mokaya et al. |
| 2015/0051470 A1 | 2/2015 | Bailey et al. |
| 2015/0057770 A1 | 2/2015 | Bailey et al. |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0169074 A1 | 6/2015 | Ataee et al. |
| 2015/0193949 A1 | 7/2015 | Katz et al. |
| 2015/0234426 A1 | 8/2015 | Bailey et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0313496 A1 | 11/2015 | Connor |
| 2015/0325202 A1 | 11/2015 | Lake et al. |
| 2015/0346701 A1 | 12/2015 | Gordon et al. |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0187992 A1 | 6/2016 | Yamamoto et al. |
| 2016/0235323 A1 | 8/2016 | Tadi et al. |
| 2016/0262687 A1 | 9/2016 | Imperial |
| 2016/0274758 A1 | 9/2016 | Bailey |
| 2016/0292497 A1 | 10/2016 | Kehtarnavaz et al. |
| 2016/0313798 A1 | 10/2016 | Connor |
| 2016/0313801 A1 | 10/2016 | Wagner et al. |
| 2016/0313899 A1 | 10/2016 | Noel |
| 2016/0350973 A1 | 12/2016 | Shapira et al. |
| 2017/0031502 A1 | 2/2017 | Rosenberg et al. |
| 2017/0061817 A1 | 3/2017 | Mettler May |
| 2017/0080346 A1 | 3/2017 | Abbas |
| 2017/0090604 A1 | 3/2017 | Barbier |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0188980 A1 | 7/2017 | Ash |
| 2017/0259167 A1 | 9/2017 | Cook et al. |
| 2017/0308118 A1 | 10/2017 | Ito |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0088765 A1 | 3/2018 | Bailey |
| 2018/0095630 A1 | 4/2018 | Bailey |
| 2018/0101289 A1 | 4/2018 | Bailey |
| 2018/0120948 A1 | 5/2018 | Aleem et al. |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0307314 A1 | 10/2018 | Connor |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0025919 A1 | 1/2019 | Tadi et al. |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0150777 A1 | 5/2019 | Guo et al. |

FOREIGN PATENT DOCUMENTS

| | | |
|---|---|---|
| CA | 2 939 644 A1 | 8/2015 |
| CN | 1838933 A1 | 9/2006 |
| CN | 105190578 A | 12/2015 |
| CN | 106102504 A | 11/2016 |
| EP | 2 198 521 B1 | 6/2012 |
| EP | 2 959 394 A1 | 12/2015 |
| EP | 3 104 737 A1 | 12/2016 |
| JP | H05-277080 A | 10/1993 |
| JP | 2005-095561 A | 4/2005 |
| JP | 2010-520561 A | 6/2010 |
| JP | 2016-507851 A | 3/2016 |
| JP | 2017-509386 A | 4/2017 |
| KR | 10-2015-0123254 A | 11/2015 |
| KR | 10-2016-0121552 A | 10/2016 |
| KR | 10-1790147 B1 | 10/2017 |
| WO | 2008/109248 A2 | 9/2008 |
| WO | 2009/042313 A1 | 4/2009 |
| WO | 2014/130871 A1 | 8/2014 |
| WO | 2014/186370 A1 | 11/2014 |
| WO | 2014/194257 A1 | 12/2014 |
| WO | 2014/197443 A1 | 12/2014 |
| WO | 2015/027089 A1 | 2/2015 |
| WO | 2015/073713 A1 | 5/2015 |
| WO | 2015/081113 A1 | 6/2015 |
| WO | 2015/123445 A1 | 8/2015 |
| WO | 2015/199747 A1 | 12/2015 |
| WO | 2016/041088 A1 | 3/2016 |
| WO | 2017/062544 A1 | 4/2017 |
| WO | 2017/120669 A1 | 7/2017 |
| WO | 2017/172185 A1 | 10/2017 |
| WO | 2019/148002 A1 | 8/2019 |

OTHER PUBLICATIONS

Notice of Allowance received for U.S. Appl. No. 16/258,442 dated Jul. 16, 2019, 17 pages.
Saponas et al., "Making Muscle-Computer Interfaces More Practical," CHI 2010, Brauns and Brawn, Apr. 10-15, 2010, pp. 851-854.
International Search Report and Written Opinion for International Application No. PCT/US2017/043693 dated Oct. 6, 2017.
International Preliminary Report on Patentability for International Application No. PCT/US2017/043693 dated Feb. 7, 2019.
International Search Report and Written Opinion for International Application No. PCT/US2017/043686 dated Oct. 6, 2017.
International Preliminary Report on Patentability for International Application No. PCT/US2017/043686 dated Feb. 7, 2019.
International Search Report and Written Opinion for International Application No. PCT/US2017/043791 dated Oct. 5, 2017.
International Preliminary Report on Patentability for International Application No. PCT/US2017/043791 dated Feb. 7, 2019.
International Search Report and Written Opinion for International Application No. PCT/US2017/043792 dated Oct. 5, 2017.
International Preliminary Report on Patentability for International Application No. PCT/US2017/043792 dated Feb. 7, 2019.
International Search Report and Written Opinion for International Application No. PCT/US2018/056768 dated Jan. 15, 2019.
International Search Report and Written Opinion for International Application No. PCT/US2018/061409 dated Mar. 12, 2019.
Benko et al., Enhancing Input On and Above the Interactive Surface with Muscle Sensing. The ACM International Conference on Interactive Tabletops and Surfaces. ITS '09.2009:93-100.
Boyali et al., Spectral Collaborative Representation based Classification for hand gestures recognition on electromyography signals. Biomedical Signal Processing and Control. 2016;24: 11-18.
Cheng et al., A Novel Phonology—and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.

(56) References Cited

OTHER PUBLICATIONS

Ding et al., HMM with improved feature extraction-based feature parameters for identity recognition of gesture command operators by using a sensed Kinect-data stream. Neurocomputing. 2017;262: 108-19.
Farina et al., Man/machine interface based on the discharge timings of spinal motor neurons after targeted muscle reinnervation. Nature. Biomedical Engineering. 2017;1: 1-12.
Gallina et al., Surface EMG Biofeedback. Surface Electromyography: Physiology, Engineering, and Applications. 2016:485-500.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9): 1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Li et al., Motor Function Evaluation of Hemiplegic Upper-Extremities Using Data Fusion from Wearable Inertial and Surface EMG Sensors. Sensors. MDPI. 2017;17(582): 1-17.
Mcintee, A Task Model of Free-Space Movement-Based Geastures. Dissertation. Graduate Faculty of North Carolina State University. Computer Science. 2016. 129 pages.
Naik et al., Source Separation and Identification issues in bio signals: A solution using Blind source seperation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13: 1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Shen et al., I am a Smartwatch and I can Track my User's Arm. University of Illinois at Urbana-Champaign. MobiSys' 16. 12 pages.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358)1-14.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 16, 2019.
International Search Report and Written Opinion for International Application No. PCT/US2019/015244 dated May 16, 2019.
International Search Report and Written Opinion for International Application No. PCT/US2019/020065 dated May 16, 2019.
Arkenbout et al., Robust Hand Motion Tracking through Data Fusion of 5DT Data Glove and Nimble VR Kinect Camera Measurements. Sensors. 2015;15:31644-71.
Davoodi et al., Development of a Physics-Based Target Shooting Game to Train Amputee Users of Multi joint Upper Limb Prostheses. Presence. Massachusetts Institute of Technology. 2012;21(1):85-95.
Favorskay A et al., Localization and Recognition of Dynamic Hand Gestures Based on Hierarchy of Manifold Classifiers. International Archives of the Photogrammetry, Remote Sensing and Spatial Information Sciences. 2015; XL-5/W6:1-8.
Hauschild et al., A Virtual Reality Environment for Designing and Filling Neural Prosthetic Limbs. IEEE Transactions on Neural Systems and Rehabilitation Engineering. 2007; 15( 1) :9-15.
Lee et al., Motion and Force Estimation System of Human Fingers. Journal of Institute of Control, Robotics and Systems. 2011;17(10):1014-1020.
Lopes et al., Hand/arm gesture segmentation by motion using IMU and EMG sensing. ScienceDirect. Elsevier Procedia Manufacturing. 2017; 11: 107-13.
Martin et al., A Novel Approach of Prosthetic Arm Control using Computer Vision, Biosignals, and Motion Capture. IEEE. 2014. 5 pages.
Mendes et al., Sensor Fusion and Smart Sensor in Sports and Biomedical Applications. Sensors. 2016;16(1569): 1-31.
Sauras-Perez et al., A Voice and Pointing Gesture Interaction System for Supporting Human Spontaneous Decisions in Autonomous Cars. Clemson University. All Dissertations. 2017. 174 pages.
Sartori et al., Neural Data-Driven Musculoskeletal Modeling for Personalized Neurorehabilitation Technologies. IEEE Transactions on Biomedical Engineering.2016;63(5):879-93.

* cited by examiner

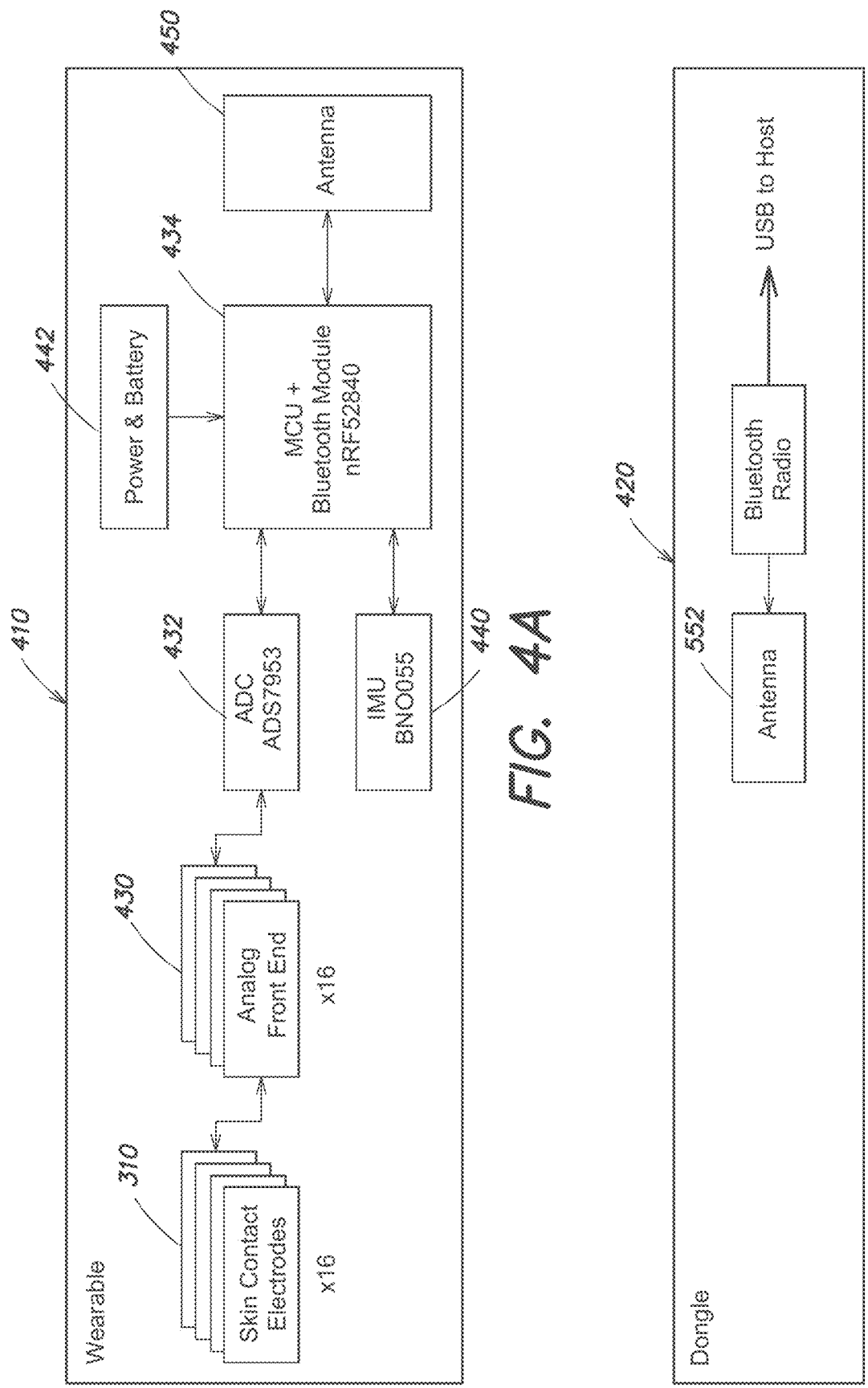

TECHNIQUES FOR ANONYMIZING NEUROMUSCULAR SIGNAL DATA

RELATED APPLICATIONS

This application claims priority under 35 USC 119(e) of U.S. Provisional Application Ser. No. 62/621,782, filed Jan. 25, 2018, entitled "TECHNIQUES FOR ANONYMIZING NEUROMUSCULAR SIGNAL DATA", which is incorporated by reference in its entirety.

BACKGROUND

In some computer applications that generate representations of the human body, it is desirable for the application to know the spatial positioning, orientation and movement of a user's body to provide a realistic representation of body movement. For example, in a virtual reality (VR) environment, tracking the spatial position of the user's hand enables the application to represent hand motion in the VR environment, which allows the user to interact with (e.g., by grasping or manipulating) virtual objects within the VR environment. Some existing techniques for tracking movements of a user's body using wearable sensors include using information obtained from multiple Inertial Measurement Units (IMUs) affixed to different parts of the user's body, and using external imaging devices (e.g., fixed-position cameras) to reconstruct the position and orientation of parts of the user's body.

SUMMARY

In some computer applications that generate musculoskeletal representations of the human body, it is appreciated that it is desirable for the application to provide a more realistic representation of body position, movement, and force. In an example in the VR environment, tracking the spatial position of the user's hand enables virtually rendering a hand, and rendering that realistically approximates natural kinematics and gestures may enhance immersion for the user in the virtual environment. Although some camera-based systems attempt to track movement a user's body, it is appreciated that such interpretations may be improved by using wearable neuromuscular sensors for physiological measurements and modeling based on human anatomy.

Some embodiments are directed to predicting information about the positioning, movements, and/or force of portions of a user's arm and/or hand represented as a multi-segment articulated rigid body system with joints connecting the multiple segments of the rigid body system. Signals recorded by wearable neuromuscular sensors placed at locations on the user's body are provided as input to a statistical model trained to predict estimates of the position (e.g., absolute position, relative position, orientation) and forces associated with a plurality of rigid segments in a computer-based musculoskeletal representation associated with a part of the user' body (e.g., hand) when a user performs one or more movements. The combination of position information and force information associated with segments of a musculoskeletal representation associated with a hand is colloquially referred to herein as a "handstate" of the musculoskeletal representation. As a user performs different movements, a trained statistical model interprets neuromuscular signals recorded by the wearable neuromuscular sensors into position and force estimates (handstate information) that are used to update the musculoskeletal representation. As the neuromuscular signals are continuously recorded, the musculoskeletal representation is updated in real time (or near real time) and a visual representation of a hand (e.g., within a virtual reality environment) is optionally rendered based on the current handstate estimates.

Other embodiments are directed to a computerized system for anonymizing neuromuscular signals used to generate a musculoskeletal representation. The system comprises a plurality of neuromuscular sensors configured to continuously record a plurality neuromuscular signals from a user, wherein the plurality of neuromuscular sensors are arranged on one or more wearable devices, and at least one computer processor. The at least one computer processor is programmed to provide as input to a trained statistical model, the plurality of neuromuscular signals and/or information based on the plurality of neuromuscular signals, and generate, the musculoskeletal representation based, at least in part, on an output of the trained statistical model, wherein the musculoskeletal representation is an anonymized musculoskeletal representation from which at least one personal characteristic of the user has been removed.

In one aspect, the at least one computer is further programmed to process the plurality of neuromuscular signals and/or the information based on the plurality of neuromuscular signals to remove the at least one personal characteristic of the user.

In another aspect, the at least one personal characteristic of the user is removed from the plurality of neuromuscular signals and/or the information based on the plurality of neuromuscular signals prior to providing the plurality of neuromuscular signals and/or the information based on the plurality of neuromuscular signals as input to the trained statistical model.

In another aspect, the at least one personal characteristic of the user relates to at least one of muscle fatigue, muscle activity level, muscle frequency content, and muscle spiking pattern.

In another aspect, the at least one personal characteristic of the user relates to a body mass index or body fat percentage of the user.

In another aspect, the at least one computer processor is further programmed to store the plurality of neuromuscular signals and/or the information based on the plurality of neuromuscular signals in a storage device, and the at least one personal characteristic of the user is removed from the plurality of neuromuscular signals and/or the information based on the plurality of neuromuscular signals prior to storage of the plurality of neuromuscular signals and/or the information based on the plurality of neuromuscular signals in the storage device.

In another aspect, the at least one personal characteristic of the user comprises at least one movement pattern associated with a neurological disorder or a non-pathological idiosyncrasy.

In another aspect, the at least one computer processor is further programmed to process the plurality of neuromuscular signals and/or the information based on the plurality of neuromuscular signals to identify the at least one movement pattern in the plurality of neuromuscular signals and/or the information based on the plurality of neuromuscular signals, and remove the identified at least one movement pattern from the plurality of neuromuscular signals and/or the information based on the plurality of neuromuscular signals.

In another aspect, the at least one computer processor is further programmed to remove the at least one personal characteristic of the user from the plurality of neuromuscular signals and/or information based on the neuromuscular signals during training of the trained statistical model.

In another aspect, the at least one computer processor is further programmed to process the output of the trained statistical model to remove the at least one personal characteristic of the user.

In another aspect, processing the output of the trained statistical model comprises averaging the output of the trained statistical model over time to generate a smoothed output of the trained statistical model.

In another aspect, processing the output of the trained statistical model comprises mapping the output of the trained statistical model to at least one state of a plurality of discrete states, wherein each state of the plurality of discrete states represents a generic movement pattern.

In another aspect, the at least one computer processor is further programmed to render a visual representation based on the musculoskeletal representation, and the at least one personal characteristic of the user is removed during rendering of the visual representation.

In another aspect, the at least one personal characteristic of the user is removed by altering a dimension of one or more fingers of the hand during rendering of the visual representation of the hand.

In another aspect, the at least one personal characteristic of the user is removed by mapping the visual representation to at least one state of a plurality of discrete states, wherein each state of the plurality of discrete states represents a generic visual representation.

In another aspect, the at least one personal characteristic of the user comprises a first personal characteristic of the user that is re-applied to the musculoskeletal representation.

In another aspect, the musculoskeletal representation is altered to reflect a personalization associated with a different user.

Other embodiments are directed to a method for anonymizing neuromuscular signals used to generate a musculoskeletal representation. The method comprises recording, using a plurality of neuromuscular sensors arranged on one or more wearable devices, a plurality of neuromuscular signals from a user, providing as input to a trained statistical model, the plurality of neuromuscular signals and/or information based on the plurality of neuromuscular signals, and generating the musculoskeletal representation based, at least in part, on an output of the trained statistical model, wherein the musculoskeletal representation is an anonymized musculoskeletal representation from which at least one personal characteristic of the user has been removed.

In one aspect, the plurality of neuromuscular signals and/or the information based on the plurality of neuromuscular signals is processed to remove the at least one personal characteristic of the user.

Other embodiments are directed to a computer-readable medium encoded with a plurality of instructions that, when executed by at least one computer processor performs a method. The method comprises providing as input to a trained statistical model, a plurality of neuromuscular signals recorded from a user by a plurality of neuromuscular sensors and/or information based on the plurality of neuromuscular signals, and generating the musculoskeletal representation based, at least in part, on an output of the trained statistical model, wherein the musculoskeletal representation is an anonymized musculoskeletal representation from which at least one personal characteristic of the user has been removed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIGS. 4A and 4B schematically illustrate components of a computer-based system on which some embodiments are implemented. FIG. 4A illustrates a wearable portion of the computer-based system and FIG. 4B illustrates a dongle portion connected to a computer, wherein the dongle portion is configured to communicate with the wearable portion.

DETAILED DESCRIPTION

Figure 1:
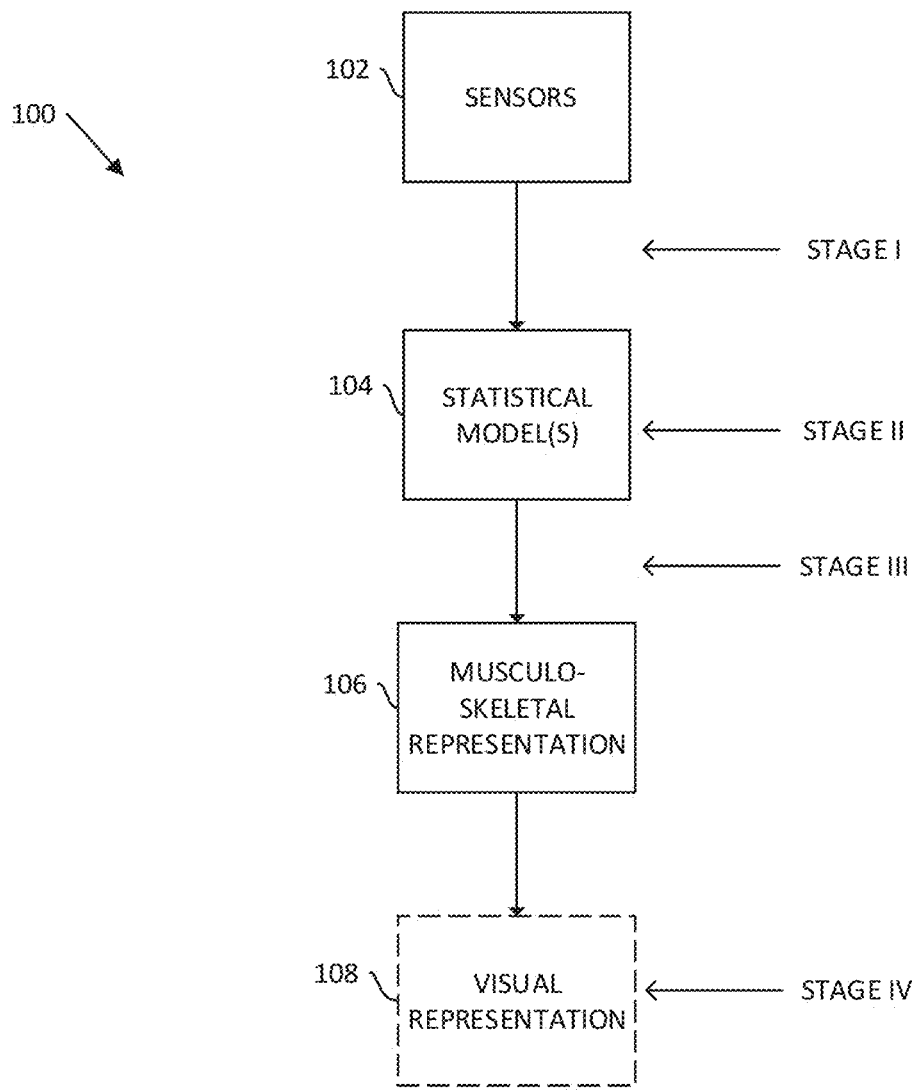
FIG. 1 is a schematic diagram of a computer-based system for reconstructing handstate information in accordance with some embodiments of the technology described herein.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained statistical model, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates a system 100 in accordance with some embodiments. The system includes a plurality of sensors 102 configured to record signals resulting from the movement of portions of a human body. Sensors 102 may include autonomous sensors. As used herein, the term "autonomous sensors" refers to sensors configured to measure the movement of body segments without requiring the use of external devices. In some embodiments, sensors 102 may also include non-autonomous sensors in combination with autonomous sensors. As used herein, the term "non-autonomous sensors" refers to sensors configured to measure the movement of body segments using external devices. Examples of external devices used in non-autonomous sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of the body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only includes a plurality of neuromuscular sensors (e.g., EMG sensors). In other embodiments, sensors 102 includes a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

System 100 also includes one or more computer processors (not shown in FIG. 1) programmed to communicate with sensors 102. For example, signals recorded by one or more of the sensors may be provided to the processor(s), which may be programmed to execute one or more machine learning techniques that process signals output by the sensors 102 to train one or more statistical models 104, and the trained (or retrained) statistical model(s) 104 may be stored for later use in generating a musculoskeletal representation 106, as described in more detail below. Non-limiting examples of statistical models that may be used in accordance with some embodiments to predict handstate information based on recorded signals from sensors 102 are discussed in detail below.

System 100 also optionally includes a display controller configured to display a visual representation 108 (e.g., of a hand). As discussed in more detail below, one or more computer processors may implement one or more trained statistical models configured to predict handstate information based, at least in part, on signals recorded by sensors 102. The predicted handstate information is used to update the musculoskeletal representation 106, which is then optionally used to render a visual representation 108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. Not all embodiments of system 100 include components configured to render a visual representation. For example, in some embodiments, handstate estimates output from the trained statistical model and a corresponding updated musculoskeletal representation are used to determine a state of a user's hand (e.g., in a virtual reality environment) even though a visual representation based on the updated musculoskeletal representation is not rendered (e.g., for interacting with virtual objects in a virtual environment in the absence of a virtually-rendered hand).

In some embodiments, a computer application configured to simulate a virtual reality environment may be instructed to display or render a visual representation of the user's hand within a user interface (e.g., a graphical user interface). Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 102 and processed by the trained statistical model(s) 104 to provide an updated computer-generated representation of the user's position, movement, and/or exerted force that is updated in real-time.

As discussed above, some embodiments are directed to using a statistical model for predicting musculoskeletal information based on signals recorded from wearable autonomous sensors. The statistical model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on ground truth data on the position and exerted forces of the hand and wrist in the context of recorded sensor data (e.g., EMG data). Constraints imposed in the construction of the statistical model are those set by anatomy and the physics of a user's body, while constraints derived from statistical patterns are those set by human behavior for one or more users from which sensor measurements are measured and used to train the statistical model. As described in detail below, the constraints may comprise part of the statistical model itself being represented by information (e.g., connection weights between nodes) in the model.

As discussed above, some embodiments are directed to using a statistical model for predicting handstate information to enable the generation and/or real-time update of a computer-based musculoskeletal representation. The statistical model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Biosensors and other systems that collect personally identifiable information often include systems to ensure the privacy of the user. For example, in a healthcare system, personally identifiable information may be considered private health information and specific controls may be placed to ensure that such personally identifiable information is transmitted and stored in a secure manner whether in paper or digital form. For example, encryption techniques may be utilized for secure transmission and/or storage.

Signal data generated by biosensors may be used to identify a particular individual based on characteristic biophysical signals, as well as diagnose a medical condition. It can be challenging to process the signal data containing personally identifiable information in a way such that features that can be used to identify a particular individual are masked while features of the signal data or information derived from the signal data that can be used to extract meaningful information (e.g., for tracking a part of the user's body or for a clinical diagnosis) are retained. The inventors have recognized that anonymizing signal data and information derived from the signal data while retaining the ability to use that data to extract meaningful information would be beneficial, for example, in situations where privacy is a concern.

The inventors have further recognized that some individuals using systems such as those described in connection with FIG. 1 may have personal characteristics that may be evident in recorded sensor signals. Such personal characteristics may include sensitive information associated with these individuals or may be embarrassing for or be used to otherwise identify these individuals, for example, in a virtual reality environment. The personal characteristics may include short-term or instantaneous characteristics (such as muscle fatigue, muscle scale, or frequency content) and long-term characteristics (such as a personally-identifiable pattern of neuromuscular data, tremors, or other movement patterns). The inventors have appreciated that anonymizing the sensor data recorded from a user via neuromuscular sensors and/or other sensors by removing or masking these personal characteristics from the recorded sensor data would protect the privacy of a user. For example, protecting the privacy of the individual may comprise masking a clinical disorder or symptom. In another example, anonymizing sensor data recorded from a user may enhance the individual's virtual reality experience by protecting their identity and/or masking a personal characteristic as rendered in the virtual environment. For example, for an individual with a neurological disorder causing tremors in the hand, movement patterns associated with these tremors may be removed from the sensor data collected for the individual so that a virtual rendering of the individual's hand represents the individual's movements, gestures, or forces without features related to the tremors. Removal of these movement patterns from the recorded sensor data may result in rendering a visual representation of the individual's hand (e.g., within the virtual reality environment) without any tremors.

As discussed above, signals recorded by one or more sensors 102 may be provided as input to one or more trained statistical models 104 that are configured to predict handstate information based on the signals. The predicted handstate information is used to update the musculoskeletal representation 106, which is then used to render a visual representation 108 based on the updated musculoskeletal representation incorporating the current handstate information but not the one or more personal characteristics. In some embodiments, the removal or masking of the personal characteristics (i.e., anonymizing of sensor data) may be performed at various stages of the signal processing pipeline of system 100, for example, indicated as stages I, II, III, and IV in FIG. 1.

According to some embodiments, the one or more computer processors of system 100 may be programmed to perform anonymization by processing raw signals and/or preprocessed (e.g., amplified and/or filtered) signals (e.g., neuromuscular signals) recorded from the sensors 102 (indicated as stage I in FIG. 1). The signals and/or information based on the signals may be processed to remove or mask the personal characteristics of a user. In these embodiments, the personal characteristics are removed from the signals prior to providing these signals as input to the trained statistical model(s) 104. In other words, the signals may be anonymized and the anonymized signals may be provided as input to the trained statistical model(s) 104. As such, the musculoskeletal representation 106 updated based on output model estimates is also an anonymized musculoskeletal representation from which the personal characteristics have been removed/masked.

In some embodiments, anonymizing raw neuromuscular signal data (or processed neuromuscular signal data via filtering, normalization, or other forms of signal processing) is implemented in a manner that removes a personal characteristic of the user while retaining features in the raw or processed neuromuscular data that can be used to derive meaningful information when used as an input to a statistical model as described herein. For example, neuromuscular signal data associated with a user with an essential tremor may be processed by applying a filter that is tuned to a frequency range associated with the tremor (e.g., 4-12 Hz) such that any features representing neuromuscular dynamics outside this frequency range are retained.

Anonymizing raw or pre-processed neuromuscular data can be beneficial because any subsequent transmission of the anonymized data in the downstream data pipeline maintains privacy with respect to the masked personal characteristic.

In some embodiments, the personal characteristics may include short-term or instantaneous characteristics of a user, such as, muscle fatigue, muscle scale, muscle activity level, muscle frequency content, muscle spiking patterns, and/or other characteristics. In some cases, these short-term or instantaneous characteristics may arise due to or in response to the user's use of the system. For example, a user playing a game (e.g., in a virtual reality environment) for an extended period of time may experience muscle fatigue, which may be assessed from the signals recorded by the sensors 102. However, the user may not want other players to be aware of the fact that he/she has been playing the game for an extended period of time and would, therefore, prefer the "muscle fatigue" characteristic to be removed from the recorded signals.

In other embodiments, the personal characteristics may include long-term characteristics of the user, such as tremors or other movement patterns associated with neurological disorders or non-pathological idiosyncrasies, characteristics resulting from diseases or medications, or other characteristics of the user's motor system, such as motor unit action potential waveforms. In yet other embodiments, the personal characteristics may include a body mass index and/or body fat percentage of the user, skin conductance of the user, muscle tone of the user, pulse rate of the user, blood pressure of the user, physical characteristics, such as finger and limb lengths, and/or other characteristics.

In some embodiments, a virtual rendering of the user's handstate may alter the user's true anatomy to mask his/her finger and limb lengths. In other embodiments, a virtual rendering may mask the body fat percentage of the user, a parameter which may be estimated from neuromuscular sensor data based on signal features related to filtering of electrical signals by the location and amount of adipose tissue.

In some implementations, the one or more computer processors may include or communicate with one or more detector circuits that are programmed to analyze or process the signals to identify or detect the personal characteristics in the signals. For example, a first detector circuit may be provided to identify at least one movement pattern (associated with a tremor, for example) in the neuromuscular signals and/or information based on the neuromuscular signals. In some embodiments, a power spectrum calculated from the user's neuromuscular sensor data may indicate the presence of a tremor. A second detector circuit may be provided to detect muscle fatigue from the neuromuscular signals and/or information based on the neuromuscular signals. Similarly, other detector circuits may be provided for detecting other personal characteristics from neuromuscular signals or other signals.

In some embodiments, the one or more computer processors may be programmed to remove or mask the identified personal characteristics from the neuromuscular signals or other signals. For example, a movement pattern (associated with the tremor) may be removed from the neuromuscular signals. In some implementations, removing the identified personal characteristics may include filtering the neuromuscular signals and/or other signals. In other implementations, removing or masking the identified personal characteristics may include replacing currently recorded neuromuscular signals (that include or reflect the personal characteristic, such as muscle fatigue) with previously recorded neuromuscular signals (that do not include or reflect the personal characteristic) from the user, another individual, or derived from signals recorded from a plurality of individuals. For example, a fatigue state for a user may be masked (i.e., anonymized) by replacing the currently recorded neuromuscular signals with previously recorded data for a similar position, movement, or force exerted by at least one segment of the musculoskeletal representation before the user became fatigued. In yet other implementations, characteristics associated with motor unit action potential waveforms may be hidden by processing the neuromuscular signals into a reduced form, for example, by converting the neuromuscular signal recordings to timings of motor unit action potentials or muscle activity levels. In some embodiments, jitter may be added to the timings of motor unit action potentials or muscle activity levels to mask subtle timing patterns that may be indicative of an individual's personal characteristics.

According to some embodiments, system 100 also includes at least one storage device that is configured to store the recorded sensor data and/or the one or more statistical model(s). In one embodiment, the personal characteristics are removed from the recorded sensor data (i.e., neurological or other signals and/or information based on the neurological or other signals) prior to storage of sensor data in the storage device, thereby enabling efficient usage of memory resources and enhancing privacy. In some embodiments, the recorded sensor data (which is not anonymized) is only stored on a local buffer where the recorded sensor data is anonymized (i.e., personal characteristics are removed/masked), and the anonymized sensor data is then provided as input to the trained statistical model(s) 104.

According to some embodiments, the one or more computer processors of system 100 may be programmed to perform anonymization while training the one or more statistical models 104 (indicated as stage II in FIG. 1). In these embodiments, the recorded sensor data provided as input to the statistical models includes or otherwise reflects the personal characteristic. In some implementations, an adversarial training approach may be utilized to train the statistical models to anonymize the recorded sensor data while predicting handstate information. The statistical models may output anonymized handstate information that is then used to update the musculoskeletal representation 106. As such, the musculoskeletal representation 106 is an anonymized musculoskeletal representation from which the personal characteristics have been removed/masked because the musculoskeletal representation 106 is generated based on the anonymized handstate information.

In some implementations, the adversarial training approach for anonymizing recorded sensor data while predicting handstate information includes 1) identifying specific users, and 2) using the mapping from neuromuscular activity to a specific user as input to the adversarial network which concurrently anonymizes the recorded sensor data (e.g., neuromuscular sensor data) and predicts handstate.

In some embodiments, a specific user may be identified based on recorded neuromuscular sensor data (e.g., EMG) by leveraging unique biophysical characteristics of the user. For example, the electrical signature of motor unit action potentials (MUAPs) can be represented as a wavelet (spatiotemporal pattern recorded from one or more neuromuscular sensors) that is characteristic of an individual's particular anatomy (including, for example, the specific size, location, and innervation pattern of motor units; the size of their arm; and the location and amount of adipose tissue). In other embodiments, a specific user may be identified by collecting neuromuscular sensor data from the specific user and a plurality of other users and training an adversarial network (or other appropriate network) to derive characteristic features that uniquely identify neuromuscular data from the user. Subsequently, new neuromuscular data from the user or another individual may be provided to the trained statistical model, which provides a likelihood or confidence level that the neuromuscular data is recorded from the specific user.

An example of how the adversarial training approach may be implemented as follows. The recorded sensor data (including, for example, non-anonymized sensor data collected from multiple individuals together with corresponding ground truth data representing expected model output estimates) may be provided as input to a pre-trained statistical model F. The pre-trained statistical model F receives as input (potentially preprocessed) neuromuscular signals x and generates a handstate prediction F(x). To remove personally identifying information from the neuromuscular signals x while preserving information about the handstate, two models (e.g., neural networks) G and H may be trained. Model G produces modified versions of the signals G(x) based on the neuromuscular signals x. Model H, which is a classifier, makes a prediction H(G(x)) about which user the signals x are recorded from based on the modified signals G(x). The parameters of model H may be optimized to reduce the classification cross-entropy, while the parameters of model G may be optimized to increase the classification cross-entropy while maintaining high accuracy of the handstate predictions F(G(x)).

According to some embodiments, the one or more computer processors of system 100 may be programmed to perform anonymization by processing an output of the trained statistical models 104 (indicated as stage III in FIG. 1). In these embodiments, the predicted handstate information output by the trained statistical models includes or otherwise reflects the personal characteristics of the user. The output of the trained statistical models may be processed to remove these personal characteristics. As such, the musculoskeletal representation 106 is an anonymized musculoskeletal representation from which the personal characteristics have been removed/masked because the musculoskeletal representation 106 is generated based on an output of the statistical model that is processed to remove these personal characteristics.

In some implementations, the processing of the output of the trained statistical model may include averaging the output over time to generate a smoothed output of the trained statistical model. For example, the temporal smoothing may be implemented using a temporal filter that generates a smoothed output of the trained statistical model. In other implementations, the output of the trained statistical model may be mapped to at least one state of a number of discrete states, where each state may represent a generic movement pattern or gesture (that is generic across a population of users). For example, when the output of the trained statistical model (i.e., the predicted handstate information) is indicative of an "open palm" gesture with tremors, the output may be mapped to a generic "open palm" gesture (without the tremors), thereby removing the undesired personal characteristics. In some embodiments, the discrete states may include discrete (e.g., stable gestures) or continuous states (e.g., particular motions).

As used herein, the term "gestures" refers to a static or dynamic configuration of one or more body parts including the position of the one or more body parts and forces associated with the configuration. For example, gestures include discrete gestures, such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards.

According to some embodiments, the one or more computer processors of system 100 may be programmed to perform anonymization during rendering of the visual representation of the hand (indicated as stage IV of FIG. 1). In these embodiments, the output of the trained statistical models (e.g., the predicted handstate information) may include or otherwise reflect the personal characteristics of the user. However, these personal characteristics are removed/masked during rendering of the visual representation.

In some embodiments, the visual representation of the hand may be altered to remove or mask one or more physical characteristics or attributes of the user. For example, a dimension of one or more fingers of the hand may be altered during rendering of the visual representation of the hand. In other embodiments, the personal characteristics may be removed/masked by mapping the visual representation to at least one state of a number of discrete states, where each state represents a generic visual representation of the hand (that is generic across a population of users).

Implementations of anonymization during rendering enable selective sharing of a personal characteristic according to the needs or preferences of the user. For example, a patient with essential tremor with limited mobility using a virtual reality environment for telemedicine and e-commerce may elect to share a realistic (non-anonymized) rendering of their hand with a clinician treating their tremor and elect to share an anonymized rendering of their hand that masks their tremor when meeting with a health insurance broker in a virtual environment. In another example, a user competing in a virtual reality multi-player contest may elect to share a non-anonymized rendering of her hand that reflects a fatigue state with her teammates and elect to share an anonymized rendering of her hand that masks the fatigue state with her opponents.

In some embodiments, various user interface controls may be provided via the user interface that enable the user to selectively share, provide, or otherwise render anonymized or non-anonymized visual representations of a part of the user's body (e.g., hand). For example, a toggle control may be provided that allows the user to select between whether the user desires to share an anonymized rendering or not with another user, group of users, or category of users (e.g., a physician).

In some embodiments, different types of personal characteristics for the same user may be removed at different stages of the pipeline. For example, the user may have a curved finger and may suffer from tremors in the hand. In this scenario, a first type of personal characteristic (e.g., tremors) may be removed at stage I and a second type of personal characteristic (e.g., curved finger) may be masked at stage IV. It will be appreciated that the examples provided herein are non-limiting, and the user's personal characteristics may be removed/masked at any one or a combination of stages.

According to some embodiments, system 100 may include a plurality of processors configured to communicate via a network. In such embodiments, anonymization of sensor data may be performed prior to transmission of the data over the network. The inventors have appreciated that it may be advantageous to anonymize sensor data prior to transmission of the data over a network to minimize risks associated with the user's identify being exposed due, for example, to eavesdropping on the transmission. In addition, when data is transmitted from a first processor to a second processor, it may be beneficial to perform anonymization on the sensor data prior to the transfer when the second processor employs lower security measures than the first processor.

The inventors have recognized and appreciated that a user may want to have a particular personalization for a particular task or have a desire to mimic personalization associated with a different user. In some implementations, the one or more computer processors may be further programmed to re-personalize the musculoskeletal representation by re-applying a particular desired personal characteristic to a musculoskeletal representation that has been anonymized using one or more of the techniques described herein. In other implementations, the one or more computer processors may be further programmed to alter the musculoskeletal representation to reflect a personalization associated with the different user (e.g., an expert user), for example, by classifying a gesture and created a visual representation of an expert performance of that gesture. As one non-limiting example, a gesture performed by a user may be identified/classified as a "painting" gesture (e.g., based on one or more gesture models or context provided by an application (e.g., an application that provides a virtual reality environment). To take on the characteristics of an "expert" painter, the visual representation of the gesture may be modified to map the movements performed by the user to movements associated with the expert painter. Such a personalization transfer may be achieved by, for example, altering the updated musculoskeletal representation of the user performing "painting" gestures to reflect a musculoskeletal representation of an expert painter performing painting gestures such that a visual representation of an expert performance of painting gestures are generated, even when the user is not an expert painter.

Figure 2:
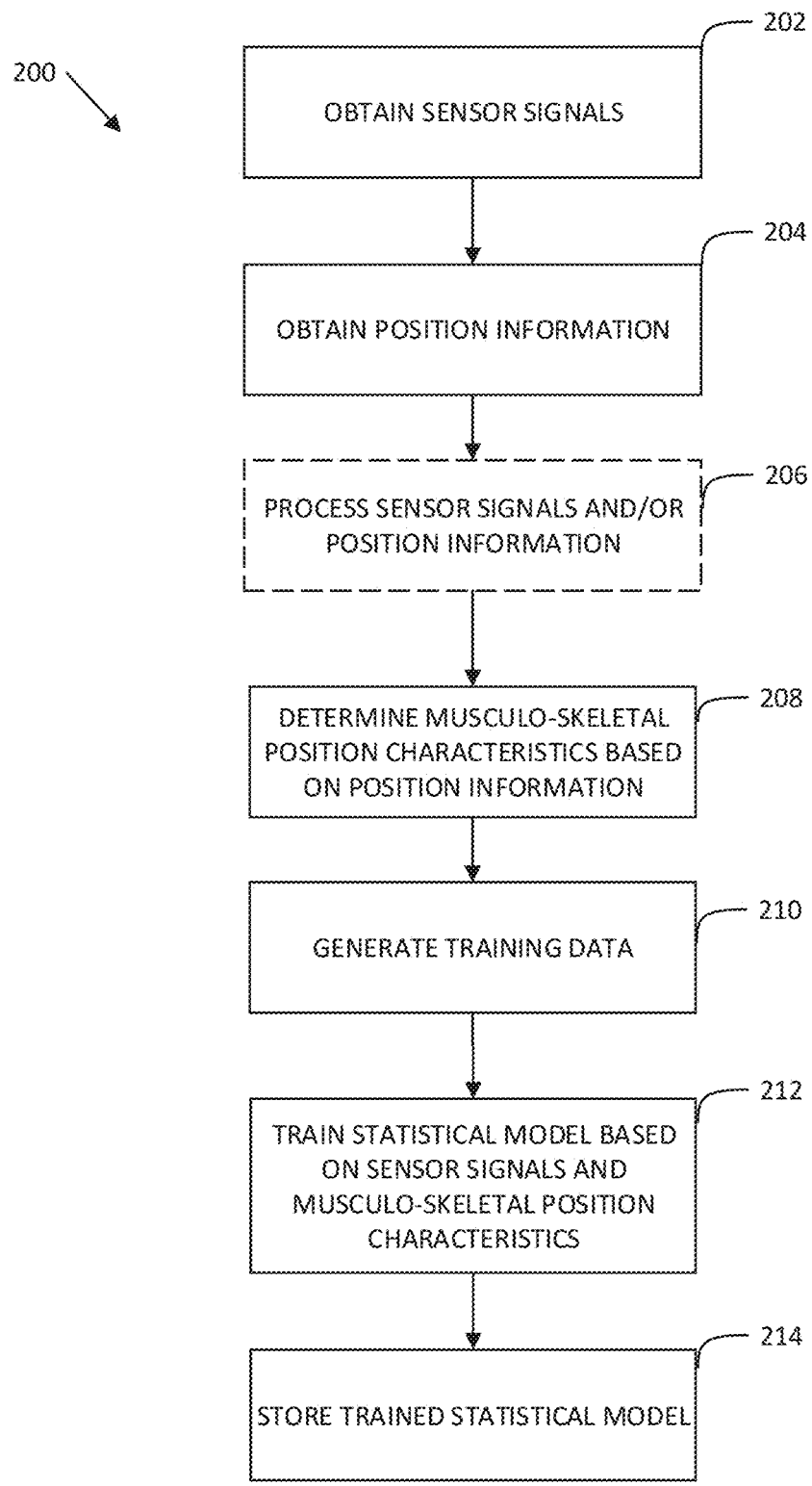
FIG. 2 is a flowchart of a process for generating a statistical model for predicting musculoskeletal position information using signals recorded from sensors, in accordance with some embodiments of the technology described herein.

FIG. 2 describes a process 200 for generating (sometimes termed "training" herein) a statistical model using signals recorded from sensors 102. Process 200 may be executed by any suitable computing device(s), as aspects of the technology described herein are not limited in this respect. For example, process 200 may be executed by one or more computer processors described with reference to FIGS. 1, 4A and 4B. As another example, one or more acts of process 200 may be executed using one or more servers (e.g., servers included as a part of a cloud computing environment). For example, at least a portion of act 210 relating to training of a statistical model (e.g., a neural network) may be performed using a cloud computing environment.

Process 200 begins at act 202, where a plurality of sensor signals are obtained for one or multiple users performing one or more movements (e.g., typing on a keyboard). In some embodiments, the plurality of sensor signals may be recorded as part of process 200. In other embodiments, the plurality of sensor signals may have been recorded prior to the performance of process 200 and are accessed (rather than recorded) at act 202.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 202 correspond to signals from one type of sensor (e.g., one or more IMU sensors or one or more neuromuscular sensors) and a statistical model may be trained based on the sensor signals recorded using the particular type of sensor, resulting in a sensor-type specific trained statistical model. For example, the obtained sensor signals may comprise a plurality of EMG sensor signals arranged around the lower arm or wrist of a user and the statistical model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical model may be trained for each of the types of sensors and the outputs of the sensor-type specific models may be combined to generate a musculoskeletal representation of the user's body. In other embodiments, the sensor signals obtained in act 202 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 202 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \leq k \leq K\}$ at time points $t_1, t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate a statistical model that can accurately predict musculoskeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculoskeletal position information associated with multiple different actions that may be taken by the user. For example, training data that incorporates musculoskeletal position information for multiple actions may facilitate generating a statistical model for predicting which of multiple possible movements a user may be performing.

As discussed above, the sensor data obtained at act 202 may be obtained by recording sensor signals as each of one or multiple users performs each of one or more tasks one or more multiple times. As the user(s) perform the task(s), position information describing the spatial position of different body segments during performance of the task(s) may be obtained in act 204. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 202 may be recorded simultaneously with recording of the position information obtained in act 804. In this example, position information indicating the position of each finger segment over time as the grasping motion is performed is obtained.

Next, process 200 proceeds to act 206, where the sensor signals obtained in act 202 and/or the position information obtained in act 204 are optionally processed. For example, the sensor signals or the position information signals may be processed using amplification, filtering, rectification, or other types of signal processing.

Next, process 200 proceeds to act 208, where musculoskeletal position characteristics are determined based on the position information (as collected in act 204 or as processed in act 206). In some embodiments, rather than using recorded spatial (e.g., x, y, z) coordinates corresponding to the position sensors as training data to train the statistical model, a set of derived musculoskeletal position characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 204 may be represented by a vector of n joint angles at each of a plurality of time points, where n is the number of joints or connections between segments in the articulated rigid body model.

Next, process 200 proceeds to act 210, where the time series information obtained at acts 202 and 208 is combined to create training data used for training a statistical model at act 210. The obtained data may be combined in any suitable way. In some embodiments, each of the sensor signals obtained at act 202 may be associated with a task or movement within a task corresponding to the musculoskeletal position characteristics (e.g., joint angles) determined based on the positional information recorded in act 204 as the user performed the task or movement. In this way, the sensor signals may be associated with musculoskeletal position characteristics (e.g., joint angles) and the statistical model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 200 proceeds to act 212, where a statistical model for predicting musculoskeletal position information is trained using the training data generated at act 210. The statistical model being trained may take as input a sequence of data sets each of the data sets in the sequence comprising an n-dimensional vector of sensor data. The statistical model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the statistical model may take as input a sequence of vectors $\{x_k | 1 \leq k \leq K\}$ generated using measurements obtained at time points $t_1, t_2, \ldots, t_K$, where the ith component of vector $x_j$ is a value measured by the ith sensor at time $t_j$ and/or derived from the value measured by the ith sensor at time $t_j$. In another non-limiting example, a derived value provided as input to the statistical model may comprise features extracted from the data from all or a subset of the sensors at and/or prior to time $t_j$ (e.g., a covariance matrix, a power spectrum, a combination thereof, or any other suitable derived representation). Based on such input, the statistical model may provide output indicating, a probability that a musculoskeletal representation of the user's body will be characterized by a set of musculoskeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 212 using the sensor data obtained at act 202.

As another example, in some embodiments, the statistical model may take as input, features derived from the sensor data obtained at act 202. In such embodiments, the statistical model may be trained at act 212 using features extracted from the sensor data obtained at act 202. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 202 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 212, values for parameters of the statistical model may be estimated from the training data generated at act 210. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 200 proceeds to act 214, where the trained statistical model is stored (e.g., in datastore—not shown). The trained statistical model may be stored using any suitable format, as aspects of the technology described herein are not limited in this respect. In this way, the statistical model generated during execution of process 200 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to a statistical model trained using one or more techniques described above in connection with FIG. 2. In some embodiments that continuously record autonomous signals, the continuously recorded signals (raw or processed) may be continuously or periodically provided as input to the trained statistical model for prediction of musculoskeletal position information (e.g., joint angles) for the given set of input sensor data. As discussed above, in some embodiments, the trained statistical model is a user-independent model trained based on autonomous sensor and position information measurements from a plurality of users. In other embodiments, the trained model is a user-dependent model trained on data recorded from the individual user from which the data associated with the sensor signals is also acquired.

After the trained statistical model receives the sensor data as a set of input parameters, the predicted musculoskeletal position information is output from the trained statistical model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained statistical model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the statistical model to provide new predictions of the musculoskeletal position information (e.g., an updated set of joint angles), the computer-based musculoskeletal representation of the user's body may be updated based on the updated set of joint angles determined based on the output of the statistical model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculoskeletal representation in real time.

Figure 3A:
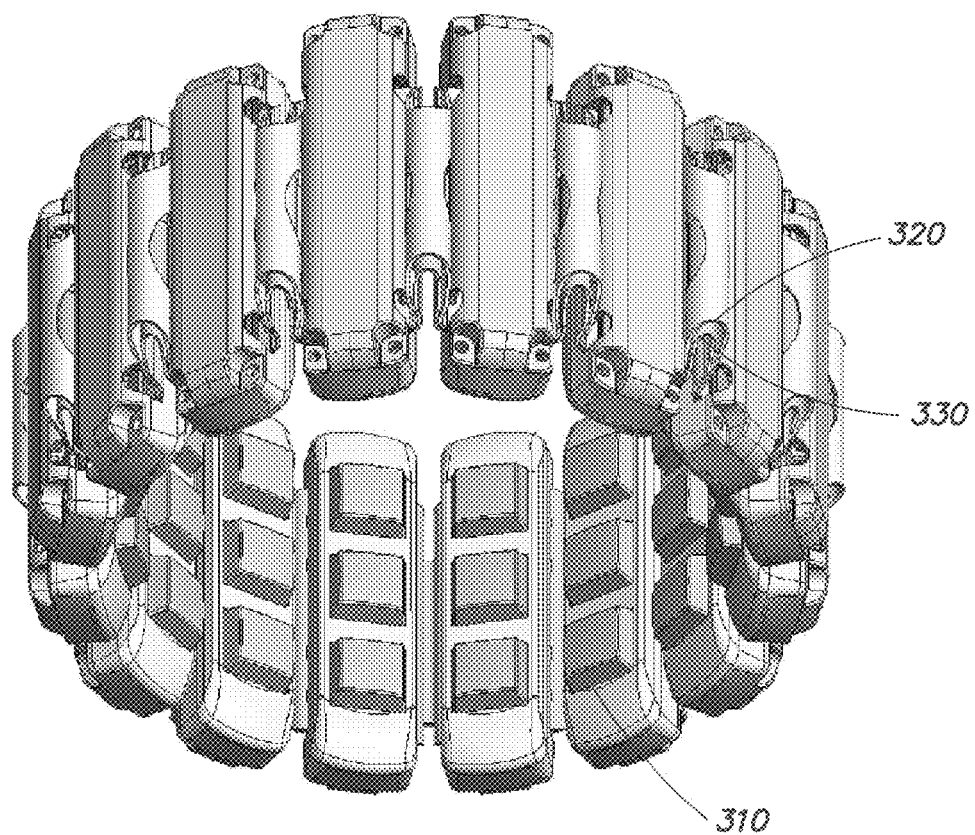
FIG. 3A illustrates a wearable system with sixteen EMG sensors arranged circumferentially around an elastic band configured to be worn around a user's lower arm or wrist, in accordance with some embodiments of the technology described herein.

FIG. 3A illustrates a wearable system with sixteen neuromuscular sensors 310 (e.g., EMG sensors) arranged circumferentially around an elastic band 320 configured to be worn around a user's lower arm or wrist. As shown, EMG sensors 310 are arranged circumferentially around elastic band 320. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

Figure 3B:
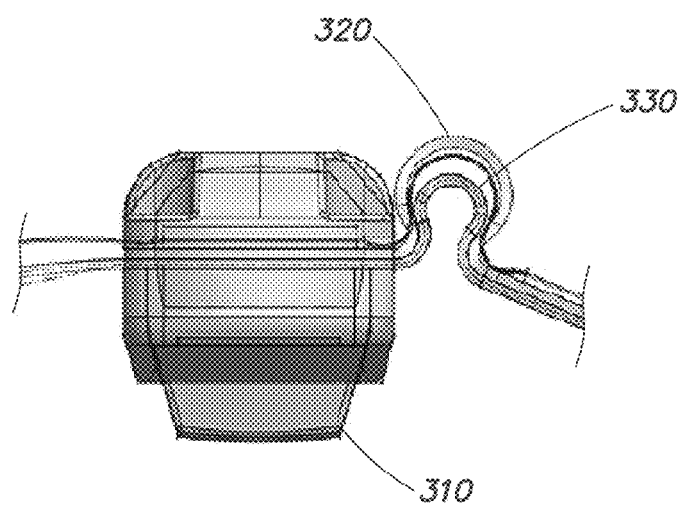
FIG. 3B is a cross-sectional view through one of the sixteen EMG sensors illustrated in FIG. 3A.

In some embodiments, sensors 310 include a set of neuromuscular sensors (e.g., EMG sensors). In other embodiments, sensors 310 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 310 may be coupled together using flexible electronics 330 incorporated into the wearable device. FIG. 3B illustrates a cross-sectional view through one of the sensors 310 of the wearable device shown in FIG. 3A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 310 are discussed in more detail below in connection with FIGS. 4A and 4B FIGS. 4A and 4B illustrate a schematic diagram with internal components of a wearable system with sixteen EMG sensors, in accordance with some embodiments of the technology described herein. As shown, the wearable system includes a wearable portion 410 (FIG. 4A) and a dongle portion 420 (FIG. 4B) in communication with the wearable portion 410 (e.g., via Bluetooth or another suitable short range wireless communication technology). As shown in FIG. 4A, the wearable portion 410 includes the sensors 310, examples of which are described in connection with FIGS. 4A and 4B. The output of the sensors 310 is provided to analog front end 430 configured to perform analog processing (e.g., noise reduction, filtering, etc.) on the recorded signals. The processed analog signals are then provided to analog-to-digital converter 432, which converts the analog signals to digital signals that can be processed by one or more computer processors. An example of a computer processor that may be used in accordance with some embodiments is microcontroller (MCU) 434 illustrated in FIG. 4A. As shown, MCU 434 may also include inputs from other sensors (e.g., IMU sensor 440), and power and battery module 442. The output of the processing performed by MCU may be provided to antenna 450 for transmission to dongle portion 420 shown in FIG. 4B.

Dongle portion 420 includes antenna 452 configured to communicate with antenna 450 included as part of wearable portion 410. Communication between antenna 450 and 452 may occur using any suitable wireless technology and protocol, non-limiting examples of which include radiofrequency signaling and Bluetooth. As shown, the signals received by antenna 452 of dongle portion 420 may be provided to a host computer for further processing, display, and/or for effecting control of a particular physical or virtual object or objects.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system for anonymizing neuromuscular signals used to generate a musculoskeletal representation, the computerized system comprising:
   a plurality of neuromuscular sensors configured to continuously record a plurality neuromuscular signals from a user, wherein the plurality of neuromuscular sensors are arranged on one or more wearable devices; and
   at least one computer processor programmed to:
      provide as input to a statistical model, the plurality of neuromuscular signals and/or information based on the plurality of neuromuscular signals, wherein the statistical model is trained to remove a first personal characteristic of the user from the plurality of neuromuscular signals and/or information based on the plurality of neuromuscular signals; and
      generate the musculoskeletal representation based, at least in part, on an output of the statistical model,
      wherein the musculoskeletal representation is an anonymized musculoskeletal representation of the user from which the first personal characteristic of the user has been removed, and
      the statistical model is further trained to predict estimates of positions associated with a plurality of rigid segments within the musculoskeletal representation.

2. The computerized system of claim 1, wherein the at least one computer processor is further programmed to process the plurality of neuromuscular signals and/or the information based on the plurality of neuromuscular signals to remove a second personal characteristic of the user.

3. The computerized system of claim 2, wherein the second personal characteristic of the user is removed from the plurality of neuromuscular signals and/or the information based on the plurality of neuromuscular signals prior to providing the plurality of neuromuscular signals and/or the information based on the plurality of neuromuscular signals as an input to the statistical model.

4. The computerized system of claim 2, wherein the at least one computer processor is further programmed to:
   store the plurality of neuromuscular signals and/or the information based on the plurality of neuromuscular signals in a storage device,
   wherein the second personal characteristic of the user is removed from the plurality of neuromuscular signals and/or the information based on the plurality of neuromuscular signals prior to storage of the plurality of neuromuscular signals and/or the information based on the plurality of neuromuscular signals in the storage device.

5. The computerized system of claim 2, wherein the second personal characteristic of the user comprises at least one movement pattern associated with a neurological disorder or a non-pathological idiosyncrasy, and the at least one computer processor is further programmed to process the plurality of neuromuscular signals and/or the information based on the plurality of neuromuscular signals to:
   identify the at least one movement pattern in the plurality of neuromuscular signals and/or the information based on the plurality of neuromuscular signals; and remove the at least one movement pattern from the plurality of neuromuscular signals and/or the information based on the plurality of neuromuscular signals.

6. The computerized system of claim 1, wherein the first personal characteristic of the user relates to at least one of muscle fatigue, muscle activity level, muscle frequency content, and muscle spiking pattern.

7. The computerized system of claim 1, wherein the first personal characteristic of the user relates to a body mass index or a body fat percentage of the user.

8. The computerized system of claim 1, wherein the first personal characteristic of the user comprises at least one movement pattern associated with a neurological disorder or a non-pathological idiosyncrasy.

9. The computerized system of claim 1, wherein the statistical model is trained to remove the first personal characteristic of the user using an adversarial training approach.

10. The computerized system of claim 9, wherein the adversarial training approach comprises using an adversarial network that is configured to concurrently remove the first personal characteristic of the user and predict estimates of position and force associated with at least one segment of the musculoskeletal representation.

11. The computerized system of claim 1, wherein the at least one computer processor is further programmed to process the output of the statistical model to remove a second personal characteristic of the user.

12. The computerized system of claim 11, wherein processing the output of the statistical model comprises averaging the output of the statistical model over time to generate a smoothed output of the statistical model.

13. The computerized system of claim 11, wherein processing the output of the statistical model comprises mapping the output of the statistical model to at least one state of a plurality of discrete states, wherein each state of the plurality of discrete states represents a generic movement pattern.

14. The computerized system of claim 1, wherein the at least one computer processor is further programmed to:
render a visual representation based on the musculoskeletal representation, wherein a second personal characteristic of the user is removed during rendering of the visual representation.

15. A computerized system for anonymizing neuromuscular signals used to generate a musculoskeletal representation, the computerized system comprising:
a plurality of neuromuscular sensors configured to continuously record a plurality of neuromuscular signals from a user, wherein the plurality of neuromuscular sensors are arranged on one or more wearable devices; and
at least one computer processor programmed to:
provide as input to a statistical model, the plurality of neuromuscular signals and/or information based on the plurality of neuromuscular signals;
generate, the musculoskeletal representation based, at least in part, on an output of the statistical model; and
render a visual representation of the user based on the musculoskeletal representation, wherein at least one personal characteristic of the user is removed during rendering of the visual representation,
wherein the visual representation includes estimates of positions associated with a plurality of rigid segments within the musculoskeletal representation.

16. The computerized system of claim 15, wherein the at least one personal characteristic of the user is removed by altering a dimension of one or more fingers of a hand during rendering of the visual representation of the hand.

17. The computerized system of claim 15, wherein the at least one personal characteristic of the user is removed by mapping the visual representation to at least one state of a plurality of discrete states, wherein each state of the plurality of discrete states represents a generic visual representation.

18. The computerized system of claim 15, wherein the at least one computer processor is further programmed to:
receive user input indicating whether to render an anonymized visual representation.

19. The computerized system of claim 18, wherein the at least one computer processor is further programmed to:
in response to a user input indicating that the anonymized visual representation is to be rendered, render the visual representation with the at least one personal characteristic removed from the visual representation.

20. A method for anonymizing neuromuscular signals used to generate a musculoskeletal representation, the method comprising:
recording, using a plurality of neuromuscular sensors arranged on one or more wearable devices, a plurality of neuromuscular signals from a user;
providing as input to a statistical model, the plurality of neuromuscular signals and/or information based on the plurality of neuromuscular signals, wherein the statistical model is trained to remove at least one personal characteristic of the user from the plurality of neuromuscular signals and/or information based on the plurality of neuromuscular signals; and
generating, the musculoskeletal representation based, at least in part, on an output of the statistical model,
wherein the musculoskeletal representation is an anonymized musculoskeletal representation of the user from which the at least one personal characteristic of the user has been removed, and
the statistical model is further trained to predict estimates of positions associated with a plurality of rigid segments within the musculoskeletal representation.

21. The method of claim 20, wherein the statistical model is trained to remove a first personal characteristic of the user using an adversarial training approach.

22. The method of claim 21, wherein the adversarial training approach comprises using an adversarial network that is configured to concurrently remove the at least one personal characteristic of the user and predict estimates of position and force associated with at least one segment of the musculoskeletal representation.

23. A method for anonymizing neuromuscular signals used to generate a musculoskeletal representation, the method comprising:
providing as input to a trained statistical model, a plurality of neuromuscular signals recorded from a user by a plurality of neuromuscular sensors and/or information based on the plurality of neuromuscular signals;
generating the musculoskeletal representation based, at least in part, on an output of the trained statistical model;
estimating positions associated with a plurality of rigid segments within the musculoskeletal representation; and
rendering a visual representation based on the musculoskeletal representation, wherein at least one personal characteristic of the user is removed during rendering of the visual representation.

24. The method of claim 23, wherein the at least one personal characteristic of the user is removed by altering a dimension of one or more fingers of a hand during rendering of the visual representation of the hand.

25. The method of claim 23, wherein the at least one personal characteristic of the user is removed by mapping the visual representation to at least one state of a plurality of discrete states, wherein each state of the plurality of discrete states represents a generic visual representation.

26. The method of claim 23, wherein the method further comprises:
   receiving user input indicating whether to render an anonymized visual representation.

27. The method of claim 26, wherein the method further comprises:
   in response to a user input indicating that the anonymized visual representation is to be rendered, rendering the visual representation with the at least one personal characteristic removed from the visual representation.

* * * * *